(12) United States Patent
Rowan et al.

(10) Patent No.: US 9,982,806 B2
(45) Date of Patent: May 29, 2018

(54) TUBULAR DUCT MEMBER

(71) Applicant: Walsh Intellectual Property Ltd., Ballinrobe (IE)

(72) Inventors: Brian Rowan, Oranmore (IE); Patrick Walsh, Castlebar (IE)

(73) Assignee: Walsh Intellectual Property Ltd., Ballinrobe (IE)

( * ) Notice: Subject to any disclaimer, the term of this patent is extended or adjusted under 35 U.S.C. 154(b) by 509 days.

(21) Appl. No.: 14/135,677

(22) Filed: Dec. 20, 2013

(65) Prior Publication Data

US 2014/0110014 A1    Apr. 24, 2014

Related U.S. Application Data

(63) Continuation of application No. 12/857,733, filed on Aug. 17, 2010, now Pat. No. 8,695,644, which is a continuation-in-part of application No. PCT/EP2010/000433, filed on Jan. 26, 2010.

(51) Int. Cl.

| F16L 9/00 | (2006.01) |
|---|---|
| F16L 9/02 | (2006.01) |
| F16L 9/22 | (2006.01) |
| F16L 23/14 | (2006.01) |
| F24F 13/02 | (2006.01) |

(52) U.S. Cl.
CPC ............... F16L 9/02 (2013.01); F16L 9/003 (2013.01); F16L 9/22 (2013.01); F16L 23/14 (2013.01); F24F 13/0209 (2013.01)

(58) Field of Classification Search
CPC .... F16L 9/02; F16L 9/003; F16L 23/14; F24F 13/0263; F24F 13/0281; F24F 13/0209

USPC ............ 138/149, 162, 163, 166, 167; 72/46; 264/269, 272.13, 150, 151, 171.14, 172.1; 156/308.6, 307.1

See application file for complete search history.

(56) References Cited

U.S. PATENT DOCUMENTS

| 2,038,389 A | 4/1936 | Siebenlist |
|---|---|---|
| 2,847,034 A | 8/1958 | Swett |
| 3,731,710 A | 5/1973 | Bauer et al. |

(Continued)

FOREIGN PATENT DOCUMENTS

| BE | 1001608 A4 | 12/1989 |
|---|---|---|
| DE | 1957274 A1 | 5/1971 |

(Continued)

OTHER PUBLICATIONS

International Search Report for PCT/EP2010/000433, dated Jun. 4, 2010, 3 pages.

(Continued)

*Primary Examiner* — Charles P Cheyney
(74) *Attorney, Agent, or Firm* — Withrow & Terranova, P.L.L.C.

(57) ABSTRACT

A tubular duct member comprises a plurality of sheet metal panels 10, 12 joined along adjacent longitudinal edges by cooperating folded sheet metal catches 14, 16, the catches being pushed together such that respective detent surfaces 28, 30 on each catch engage behind one another to retain the edges of the sheets together. One of the catches 14 includes a body 36 of resilient material compressed between the catches and biasing the catches apart to maintain the detent surfaces 28, 30 bearing against one another.

10 Claims, 11 Drawing Sheets

(56) References Cited

U.S. PATENT DOCUMENTS

| | | | |
|---|---|---|---|
| 4,280,536 A | 7/1981 | Gnant | |
| 4,878,459 A | 11/1989 | Nelson | |
| 5,876,276 A | 3/1999 | Arbucci | |
| 5,975,146 A | 11/1999 | Lardillat et al. | |
| 6,270,865 B1 * | 8/2001 | Noonan et al. | 428/34.5 |
| 6,800,299 B1 | 10/2004 | Beaudoin et al. | |
| 6,814,106 B1 | 11/2004 | Iizuka | |
| 7,624,762 B2 * | 12/2009 | Cohen et al. | 138/149 |
| 7,699,078 B1 | 4/2010 | Husmann, Jr. | |
| 7,992,904 B2 | 8/2011 | Bloom et al. | |
| 8,450,630 B2 | 5/2013 | Stoving | |
| 2001/0003993 A1 * | 6/2001 | Faverio et al. | 138/149 |
| 2003/0108381 A1 | 6/2003 | Walsh et al. | |
| 2005/0109415 A1 | 5/2005 | Snyder | |
| 2008/0142107 A1 | 6/2008 | Gudenburr et al. | |
| 2009/0058078 A1 * | 3/2009 | Knudson | 285/136.1 |

FOREIGN PATENT DOCUMENTS

| | | |
|---|---|---|
| DE | 2445443 A1 | 4/1976 |
| DE | 19839416 A1 | 3/2000 |
| EP | 0071586 A1 | 2/1983 |
| EP | 0625667 A2 | 11/1994 |
| GB | 1335774 A | 10/1973 |
| JP | S46-001987 U | 10/1971 |
| JP | 2000171085 A | 6/2000 |
| JP | 2003214692 A | 7/2003 |
| JP | 3145672 U | 10/2008 |
| JP | 5172281 B2 | 3/2013 |
| KR | 100976079 B1 | 8/2010 |
| WO | 2010094385 A1 | 8/2010 |

OTHER PUBLICATIONS

International Search Report and Written Opinion for PCT/EP2011/062930, dated Dec. 21, 2011, 10 pages.

Office Action for Japanese Patent Application No. 2011-550442, dated Aug. 27, 2013, 4 pages.

Restriction Requirement for U.S. Appl. No. 12/857,733, dated Sep. 6, 2013, 6 pages.

Notice of Allowance for U.S. Appl. No. 12/857,733, dated Nov. 6, 2013, 10 pages.

* cited by examiner

TUBULAR DUCT MEMBER

This application is a Continuation of U.S. utility application Ser. No. 12/857,733 filed Aug. 17, 2010, now U.S. Pat. No. 8,695,644, which is a Continuation-in-Part of PCT/EP2010/000433 filed Jan. 26, 2010, which claims priority to Irish national applications S2009/0132 and S2009/0133, both filed Feb. 18, 2009. The disclosures of these applications are incorporated herein by reference in their entireties.

FIELD OF THE DISCLOSURE

This invention relates to a tubular duct member, i.e. a length of duct of which a number can be joined end to end to form tubular ducting for, e.g., air and gas distribution systems.

BACKGROUND

Typically, ducting is fabricated and assembled in a workshop. It is then shipped to site, where it is combined with fittings such as reducers, T-pieces, bends, elbows, etc., to form air and gas distribution systems.

The disadvantages of the existing products are:
In the workshop fabrication process, a number of machines such as guillotines, press brakes and seamers are used, together with processes such as cutting and welding, making handling and forming expensive.
Once made, storage, handling, road haulage and shipping costs can be high, because of the significant volumes taken up by large duct cross sections.
Offloading, storage and on-site handling to the point of installation is also costly.

PRIOR ART

The following documents disclose lengths of duct manufactured by joining individual panels with male and female members that are "push-fitted" together:
1. JP 2003214692 A (FUKAGAWA) see FIGS. 1-3 and 8 in particular, and also the English language abstracts.
2. JP 5172281 A (EE O Y SYST KENKYUSHO) see FIGS. 1-3 in particular, and also the English language abstract.
3. JP 58006351 A (KAJIWARA) see FIG. 5 in particular, and also the English language abstract.
4. US 2005/0109415 A1 (SNYDER) see whole document.
5. U.S. Pat. No. 2,847,034 (SWETT) see whole document
6. DE 1957274 A1 (BRINKMANN) see whole document, especially FIGS. 1-3.
7. EP 0071586 A1 (GRIMALDI) see whole document.

Documents 1 to 4 disclose the use of small projections for retaining male members in female members to fix edges together.

Documents 1 to 3 in particular relate to ducting having a rectangular cross-section.

In document 5, the metal panels are resilient to a degree, so that the panels are sealed with respect to each other when assembled. The panels are joined by pushing a male member into a female member.

Document 6 (paragraph bridging pages 5 and 6) indicates that an adhesive may or may not be used in the joint between the male and female members.

Document 7 discloses ducting formed from more than one panel, which are joined by being joined by hooking one member within the other (and vice-versa). This document shows stacking to transport the individual parts to the site for assembly.

SUMMARY

In a first aspect the invention provides a tubular duct member comprising a plurality of circumferential sheet metal panels joined along adjacent longitudinal edges by cooperating folded sheet metal catches along each edge, the catches being pushed together such that respective detent surfaces on each catch engage behind one another to retain the edges of the sheets together, wherein at least one of the catches includes a body of resilient material compressed between the catches and biasing the catches apart to maintain the detent surfaces bearing against one another.

In a second aspect the invention provides a tubular duct member comprising a plurality of circumferential sheet metal panels joined along adjacent longitudinal edges by cooperating folded sheet metal catches along each edge, the catches being pushed together such that respective detent surfaces on each catch engage behind one another to retain the edges of the sheets together, wherein each catch comprises a folded metal rib of triangular cross-section, the detent surfaces being surfaces of said ribs, wherein a first catch comprises a first channel having opposite sidewalls with a first folded metal rib running along the inside of one sidewall of the first channel, and wherein the second catch comprises a second channel having opposite sidewalls with a second folded metal rib running along the outside of one sidewall of the second channel, the one sidewall of the second channel being inserted into the first channel so that the ribs engage behind one another and the sidewall of the first channel opposite the first folded rib being inserted into the second channel.

In a third aspect the invention provides a method of making a duct member comprising feeding sheet metal continuously from a roll, progressively folding the opposite edges of the sheet as it advances to form a respective folded metal catch along each edge, each catch including an upstanding wall defining with the main body of the sheet a shallow tray across the width of the sheet, dispensing a thermal insulator in flowable form into the shallow tray as the sheet advances so that the thermal insulator spreads out to fill substantially the full width of the tray between the upstanding walls, the liquid thereafter solidifying to form a solid thermally insulating layer, and cutting the sheet transversely into individual panels having a respective catch along each edge for in-use push fit connection to a cooperating catch along the edge of an adjacent panel.

BRIEF DESCRIPTION OF THE DRAWINGS

Embodiments of the invention will now be described, by way of example, with reference to the accompanying drawings, in which:

FIG. 2(*b*) is a cross section on line I-I of FIG. 2(*a*).

FIG. 2(*c*) is a cross section on line II-II of FIG. 2(*a*).

FIG. 3 also shows cross-sections of the folded panel 10, corresponding to those shown in FIGS. 2(a) and (b), which identify where the regions of the blank end up in the folded panel.

FIG. 4 also shows cross-sections of the folded panel 12, corresponding to those shown in FIGS. 2(a) and (c), which identify where the regions of the blank end up in the folded panel.

DETAILED DESCRIPTION

Figure 1:
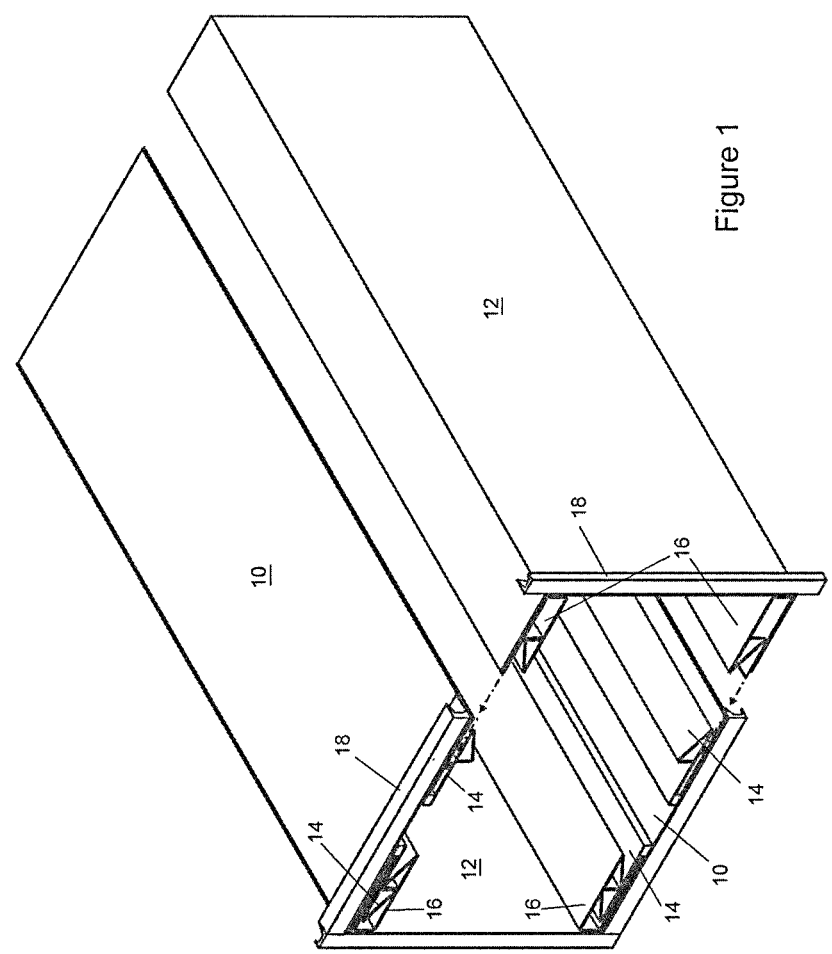
FIG. 1 is a perspective view (not to scale) of a partially assembled duct member according to a first embodiment of the invention.
Figure 2:
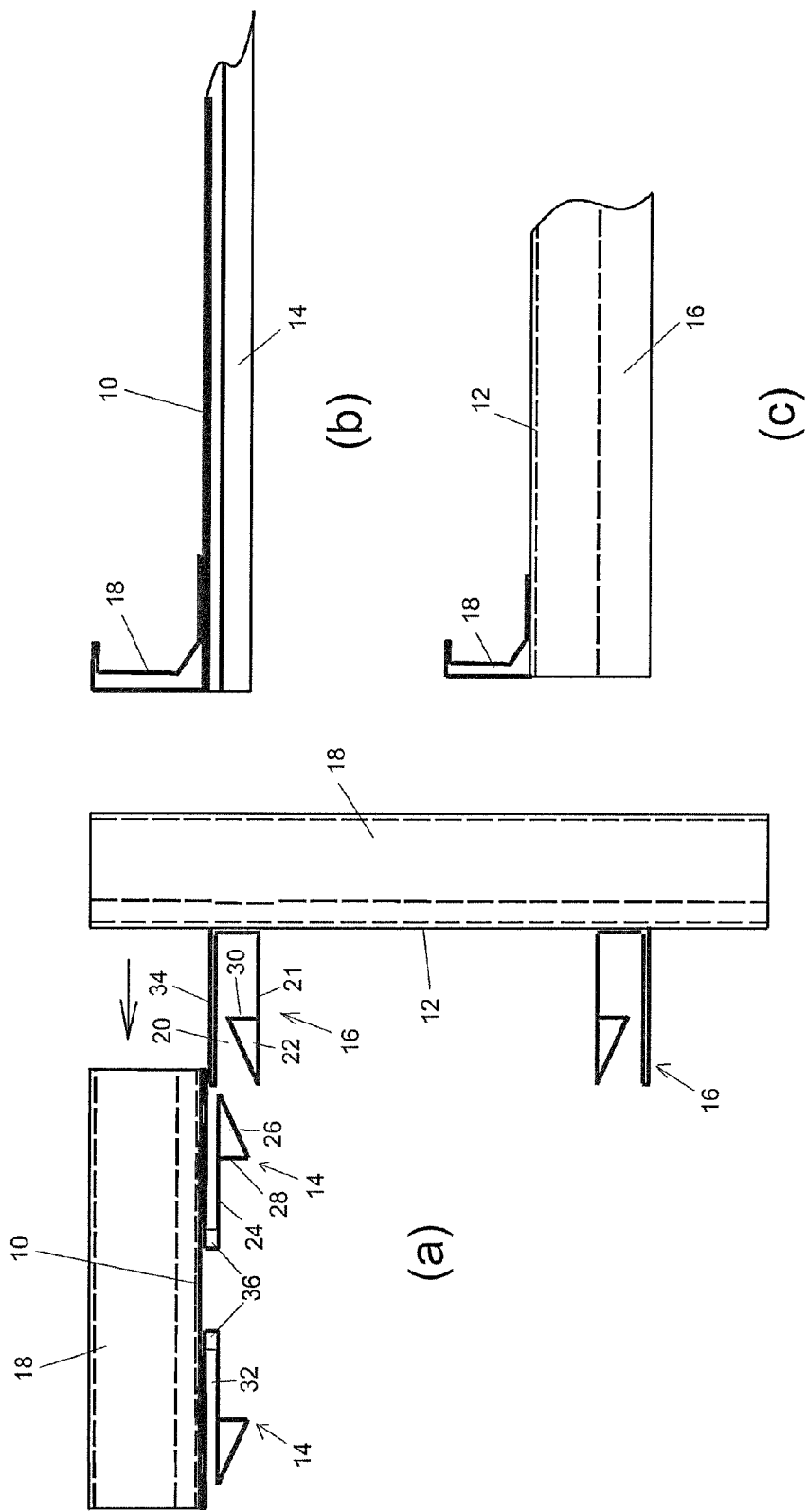
FIG. 2(*a*) is an end view of two sheet metal panels 10, 12 forming two adjacent sides of the duct member of FIG. 1 about to be fitted together.
Figure 3:
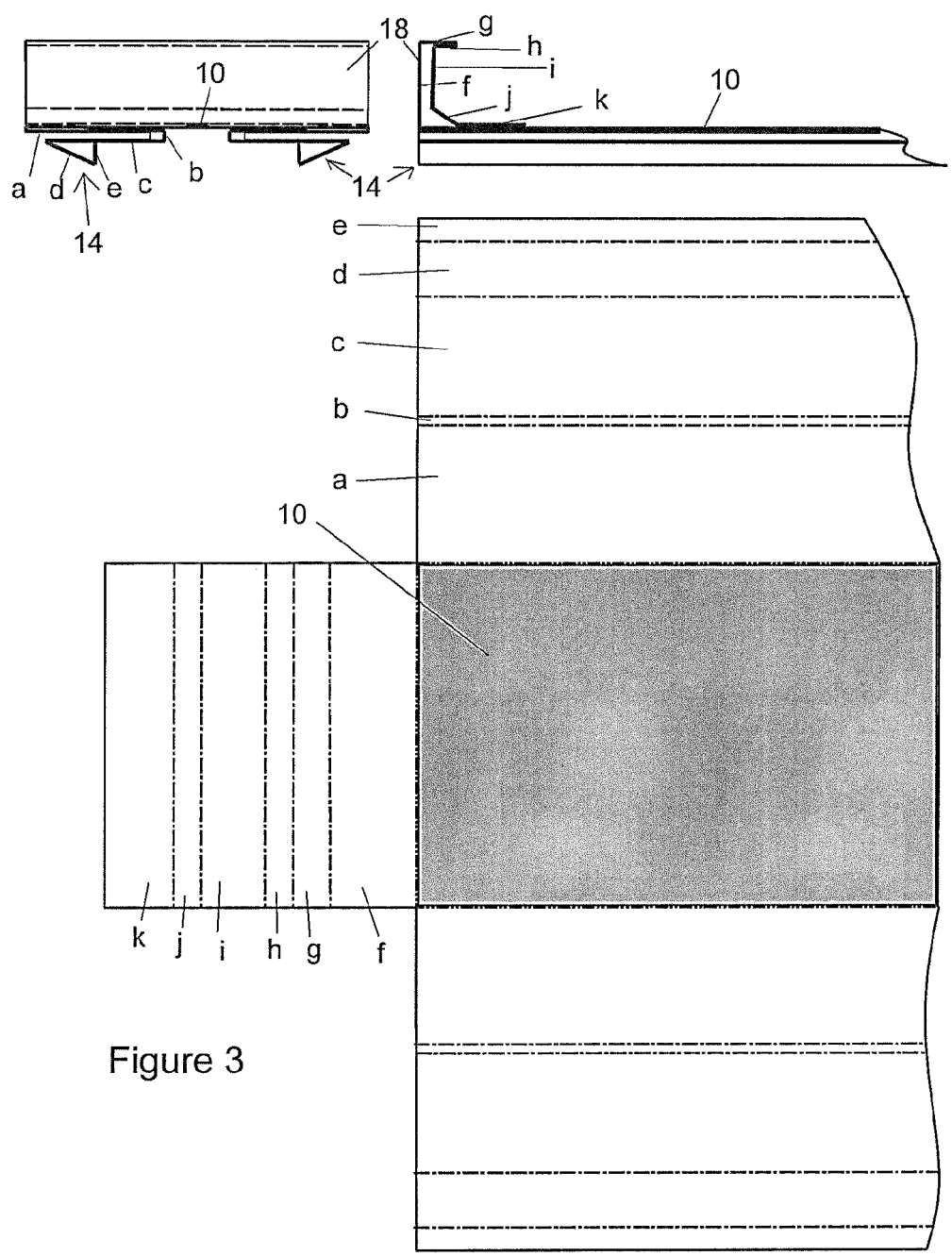
FIG. 3 shows a sheet metal blank from which the panel 10 of FIG. 1 is formed by folding.
Figure 4:
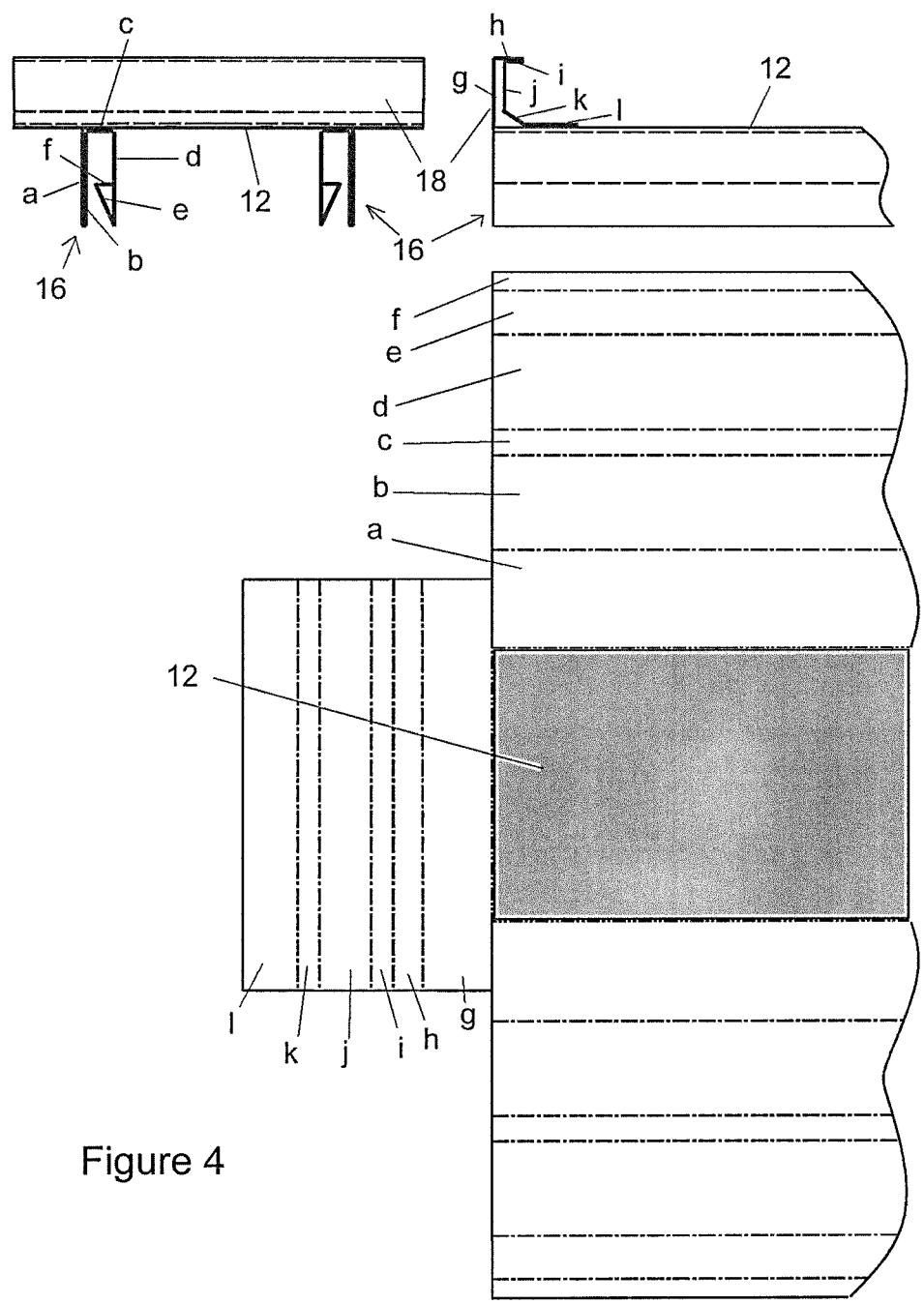
FIG. 4 shows a sheet metal blank from which the panel 12 of FIG. 1 is formed by folding.

Referring first to the embodiment shown in FIGS. 1 to 4, a tubular duct member of substantially rectangular cross-section is assembled from first and second pairs of opposite substantially flat sheet steel panels 10, 10 and 12, 12 respectively. The panels 10 and 12 are joined along adjacent longitudinal edges by cooperating catches 14 and 16 (in the present context "longitudinal" means in the direction of fluid flow in the finished duct). The catches 14 are formed along opposite edges of the panels 10 by folding lateral extensions of a single sheet steel blank in the manner shown in FIG. 3, while the catches 16 are formed along opposite edges of the panels 12 by folding lateral extensions of a single sheet steel blank in the manner shown in FIG. 4. In FIGS. 3 and 4 the lettered regions of the blanks correspond to the similarly lettered sections of the folded panel. The panels 10 and 12 also include folded sheet steel end flanges 18 which are also formed from the blanks as shown. These end flanges allow individual duct members to be bolted together end to end to form a complete ducting system.

Each catch 16 comprises a narrow channel 20 with a folded metal rib 22 of triangular cross-section running along the inside of one sidewall 21 of the channel. Each catch 14 comprises a narrow channel 32 of which one sidewall comprises a flange 24 with a folded metal rib 26 of triangular cross-section running along the length of the free edge of the flange on the outside of the channel 32. The adjacent edges of the panels 10 and 12 are joined together by lining the rib 26 up with the channel 20 and pushing the panel 12 towards the panel 10, or vice versa, so that the flange 24 enters the channel 20. The wall 21 of the channel 20 bearing the rib 22 is resiliently deflectable away from the opposite wall 34, so that the rib 26 on the flange can pass by the rib 22 by deflection of the latter. As seen, each rib 22, 26 has its apex facing the other, to facilitate the sliding engagement of the catches. When the catches are fully engaged the base 28 of the rib 26 snap-engages behind the base 30 of the rib 22, the rib 22 returning to its undeflected position. Thus the edges of the panels 10 and 12 are secured together. The edges of the panels 10, 12 at the other three corners of the duct member are joined in the same way.

At the same time as the flange 24 is slid into the channel 20 of the catch 16 the wall 34 of the catch 16 slides into the channel 32. A body of resiliently compressible plastics material 36 is disposed along the base of the channel 32, and this is compressed by the leading edge of the wall 34 when the catches 14, 16 are fully engaged. This both seals the join between the edges of the panels and biases the catches apart to maintain the bases 28, 30 of the ribs 26, 22 strongly bearing against one another to avoid a loose joint.

It will be appreciated that the triangular cross-section of the ribs provides structural rigidity to the duct, both before and after assembly. The compression seal 36 not only seals the joint but also form a key component of the mechanism locking the catches 14, 16 together.

Figure 5:
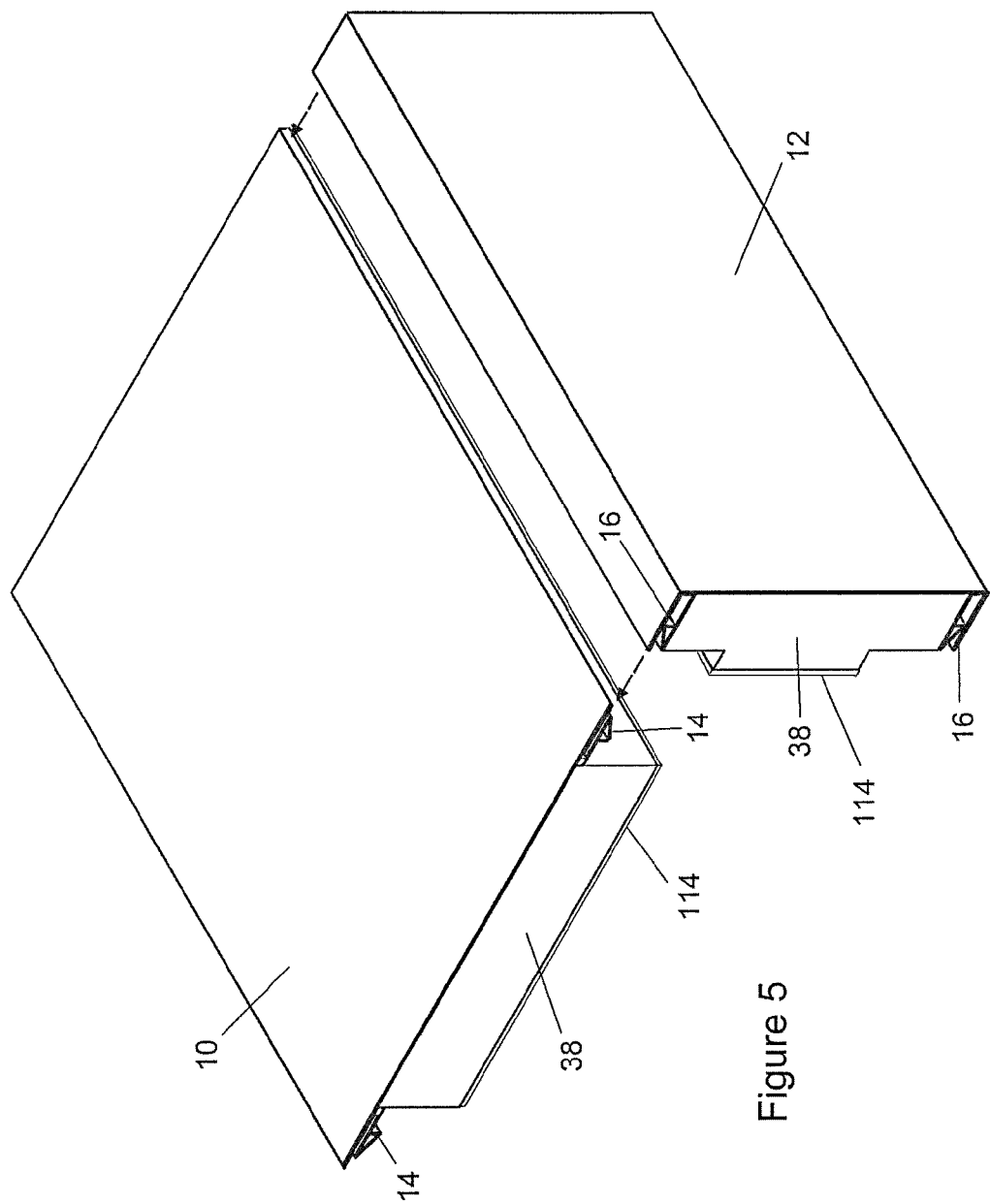
FIG. 5 shows a second embodiment of the invention employing insulating panels.

In a further embodiment, FIG. 5, the duct member has a layer 38 of thermally insulating lightweight solid foam material lining the inside surface of the each panel 10, 12.

This foam can be glued in place or in an alternative implementation; the foam can be sprayed on. In either case, it can be beneficial to provide retaining members to locate the foam within the panel. Thus, with reference to FIG. 7, it will be seen that the catches 16 of the panel 12 readily provide such retaining members—although the foam 38' in this case has a flat upper surface. In a variation of the panel 10', the catches 14' are provided with two additional extension panels to provide retaining members 52. Thus, the foam can be located between either set of catches and glued in place as shown at 50; or sprayed into the respective wells provided by the catches.

In the foregoing embodiments the circumference of the duct member is made up of four substantially flat steel panels, so that the duct member has a rectangular cross-section. In a further embodiment, FIG. 6, the duct member comprises two circumferential curved sheet steel panels 40 joined edge to edge to form a duct member of rounded (i.e. circular or elliptical) cross-section. The catches 14, 16 may be constructed the same as previously described, by folding at opposite edges of the steel panels 40.

In the foregoing embodiments, each of the panels comprises either male or female catches. However, in a fourth embodiment of the invention, each panel 80 includes a male catch 14' at one edge and a female catch 16' at its opposite edge. While it will be seen from FIG. 8 that the ribs 26' and 22' are equivalent to the ribs 26, 22 of the foregoing embodiments, instead of being folded back through right angled bends, each catch is formed by bending a flange 24' back through one curve in the case of catch 14' and two curves in the case of catch 16'. A channel 32' with a rounded base is thereby formed in catch 14' and is thus arranged to receive the curved wall 34' of a catch 16' formed in a counterpart panel (not shown).

Figure 8:
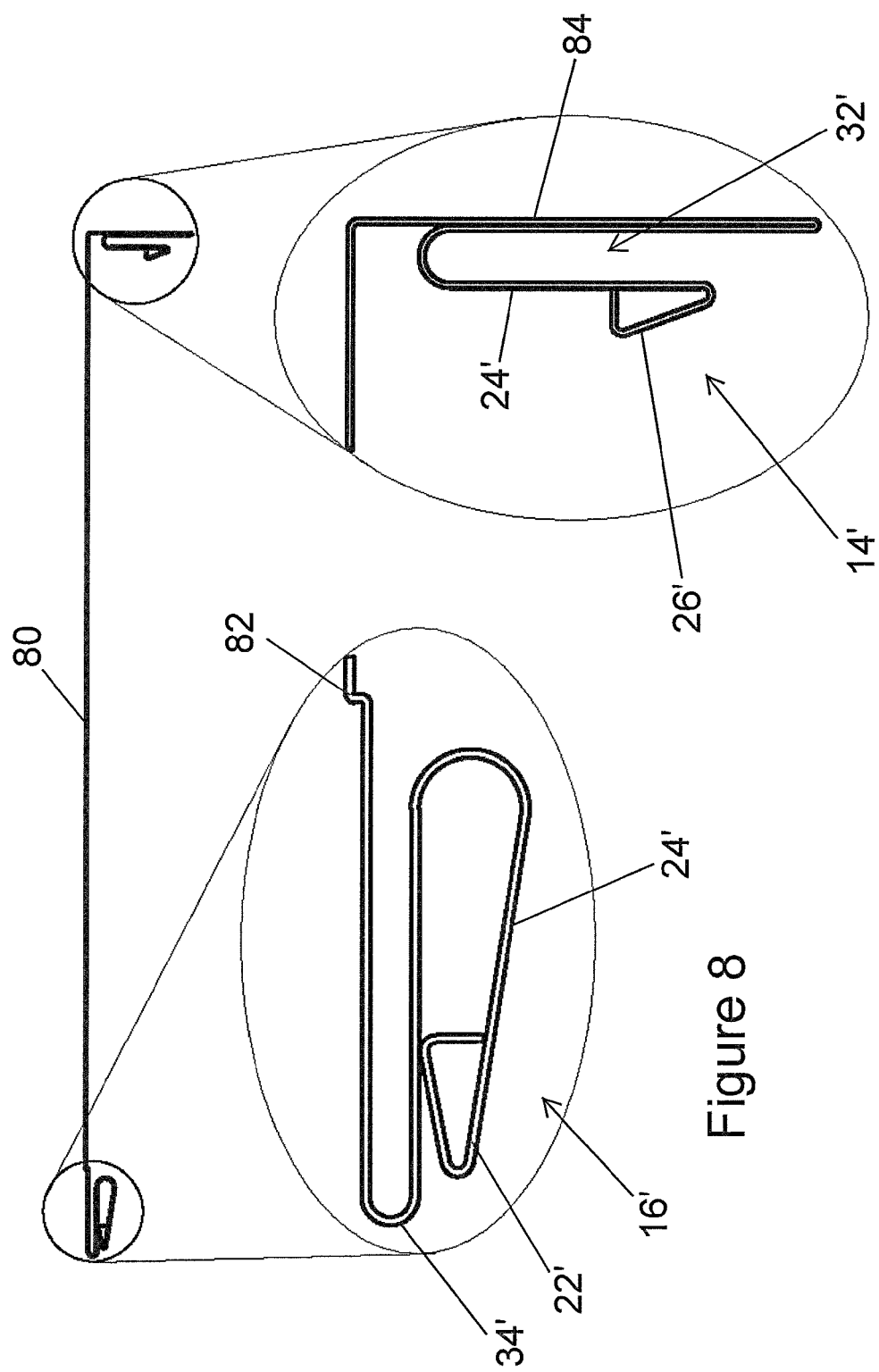
FIG. 8 shows a fourth embodiment of the invention.
Figure 9:
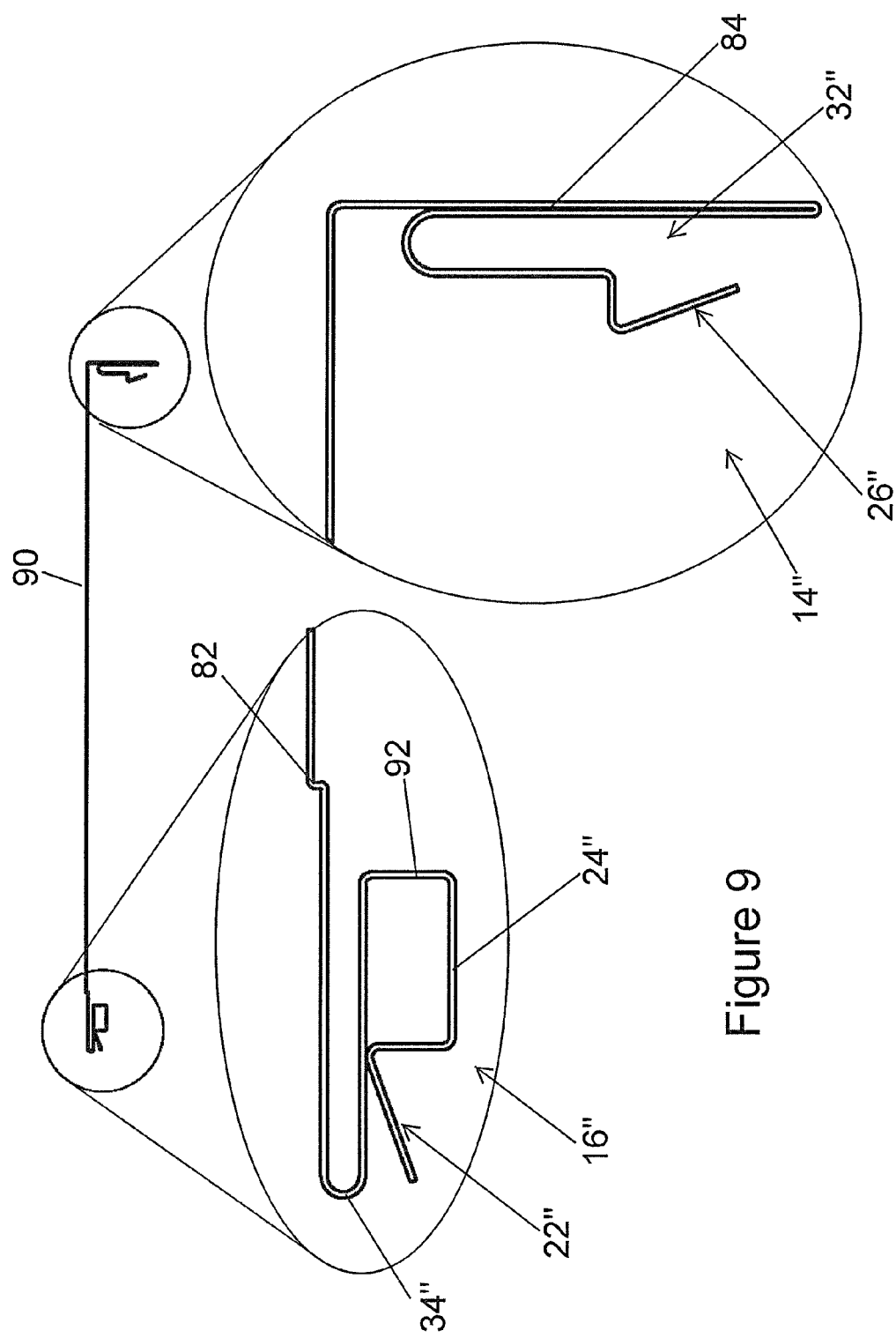
FIG. 9 shows a further variant of the embodiment of FIG. 8.

Turning now to FIG. 9, where a further variant 90 of the panel of FIG. 8 is shown. Here the triangular ribs 22" and 26" are formed by surfaces corresponding to only two sides of the triangle rather than all three surfaces as in the previous embodiments. Also, the flange 24" of catch 16" is bent once around a curve to form wall 34" and then back through 2 right angles 92 rather than around a second curve as in the panel of FIG. 8.

Although not shown in FIGS. 8 and 9, a resilient member, as in the foregoing embodiments is included in the channel 32',32".

Finally, it will be noted that a step 82 is provided in the external wall of catches 16' and 16" so that when they interlock with a catch 14', 14" of a counterpart panel, the outer wall of channel 32', 32" lies flush with the outer surface of the panel 80/90.

Figure 6:
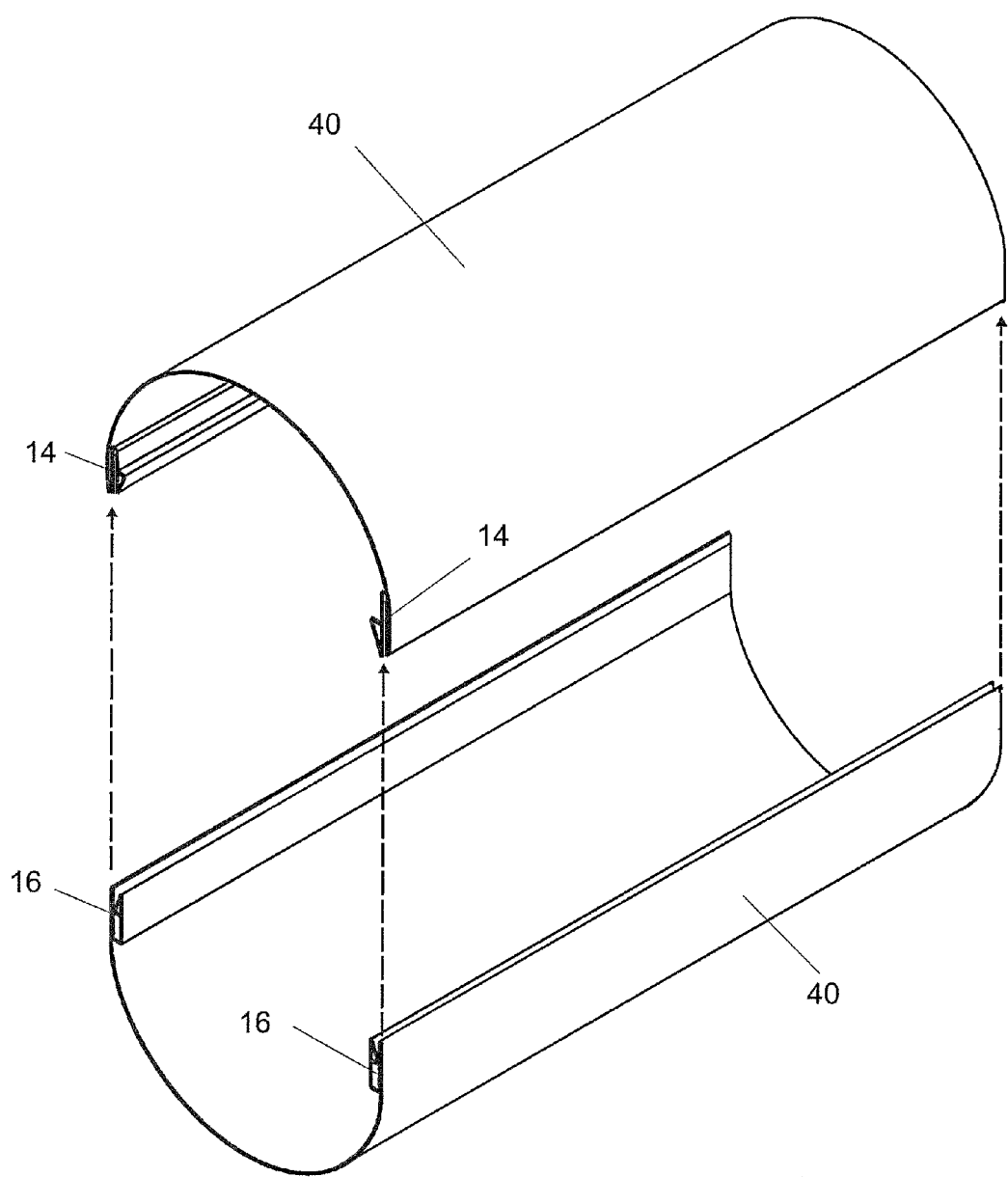
FIG. 6 shows a third embodiment of the invention.

It will be appreciated that when the embodiments of FIGS. 8 and 9 are implemented in a generally curved panel as in FIG. 6, each of the catches 14', 16' or 14", 16" will extend tangentially from the edges of the panel, rather than being bent with respect to the panel 80/90 as in the case of the catch 14' or 14" of FIGS. 8 and 9.

Figure 7:
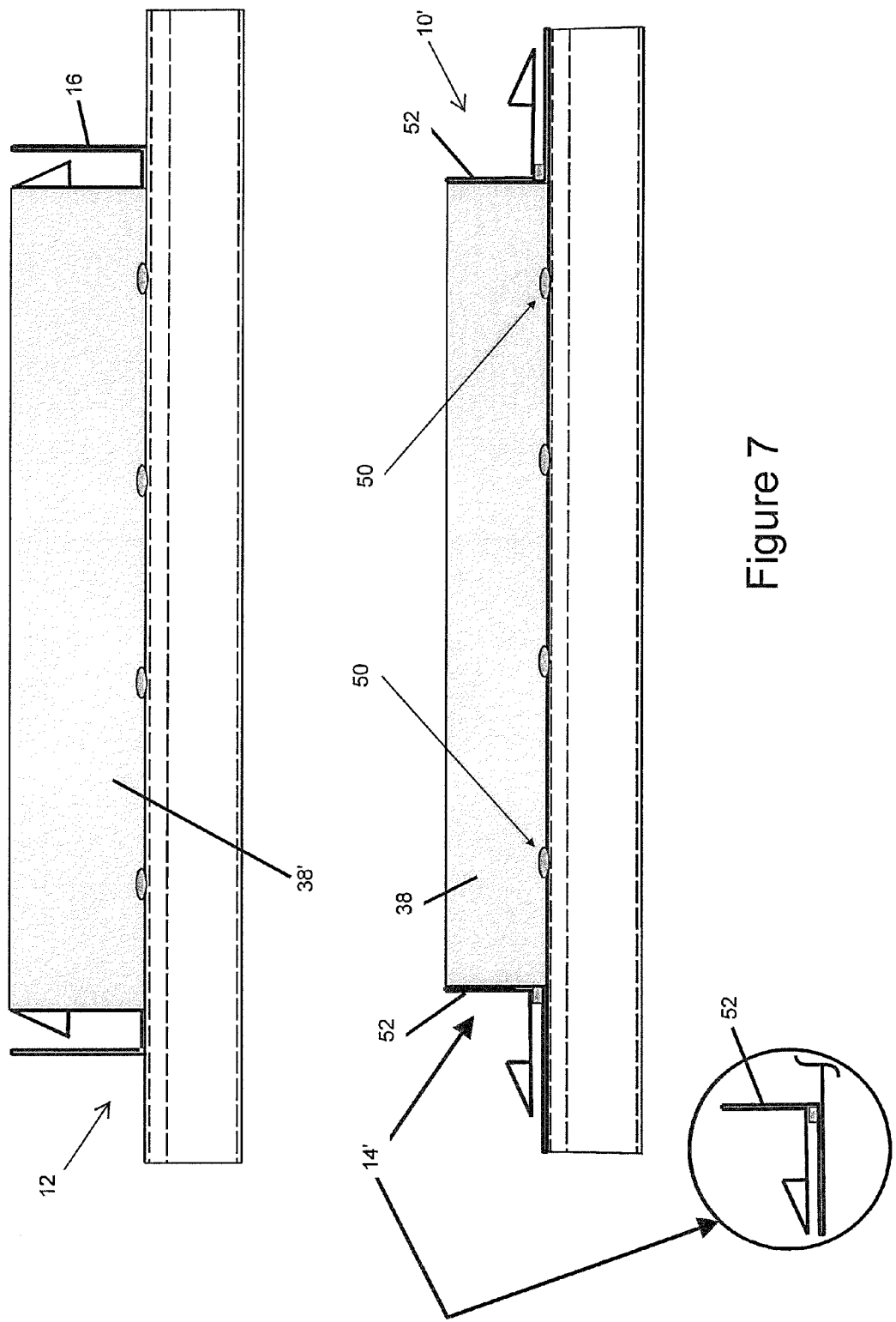
FIG. 7 shows a variant of the embodiment of FIG. 5.

It will also be appreciated that insulating material can be fitted to the internal surface of the panels 80/90 as in the embodiments of FIGS. 5 and 7, regardless of whether the panel is generally flat or curved.

Figure 10:
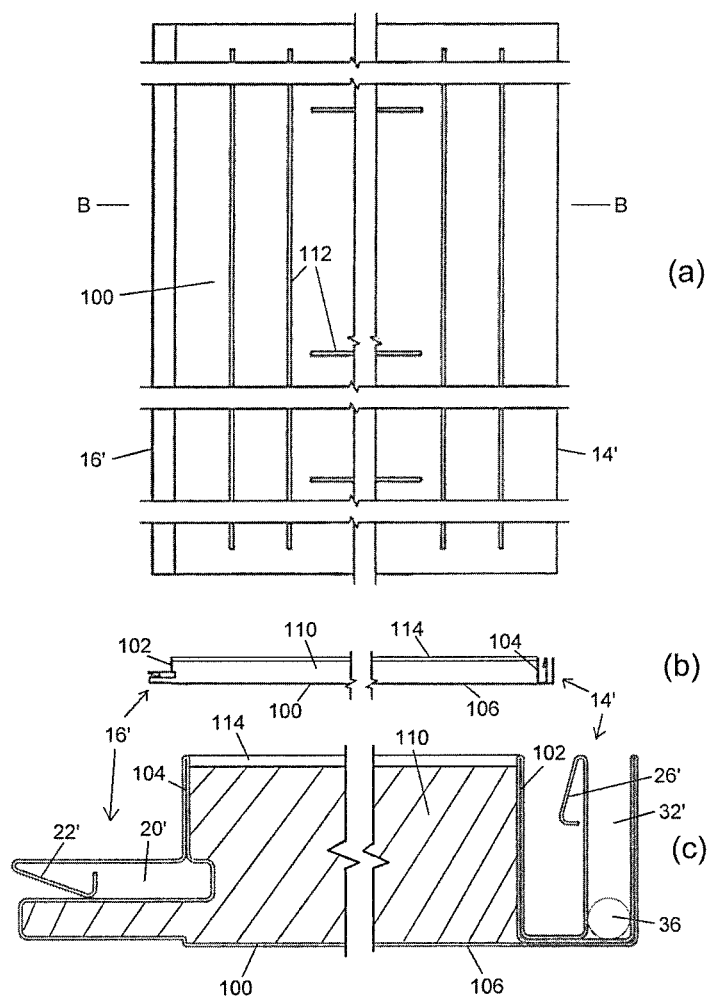
FIG. 10 shows a further embodiment of the invention.

FIG. 10 shows a further embodiment of the invention. FIG. 10(*a*) is an underneath plan view of a duct panel 100, FIG. 10(*b*) is a cross-section on the line B-B of FIG. 10(*a*), and FIG. 10(*c*) is an enlarged cross-section similar to FIG. 10(*b*).

Like FIG. 8, the panel 100 has male and female catches respectively running along opposite parallel edges. These catches are constructed and operate generally the same as the male and female catches 14', 16' of FIG. 8 and, accordingly, the same reference numerals have been applied. The following description will concentrate on the differences from the preceding embodiment, the basic operation of the catches being assumed.

The main difference is that each catch 14', 16' includes a respective upstanding wall 102, 104 formed by additional folding of the sheet metal at each edge of the panel through two 90 degree bends and one 180 degree bend, as shown in FIG. 10(*c*). These walls 102 and 104, together with the main body 106 of the panel 100 as a base, form a shallow tray across the width of the panel.

The panels 100 are produced continuously from a roll of sheet metal, the edges of the sheet being progressively folded as the sheet advances from the roll to form the catches 14', 16' and the upstanding walls 102, 104, the sheet then being cut transversely into individual panels. However, after the folding of the catches and the upstanding walls, but before the sheet is cut into individual panels, a liquid polyurethane (LPU) is continuously dispensed into the shallow tray formed by the walls 102, 104 and the metal sheet. This flows sideways to fill the full width of the tray between the walls 102, 104 and rapidly cures (within minutes) to form a solid insulating layer 110. Longitudinal and transverse strengthening ribs 112 are formed in each panel by pressing before the application of the LPU. Finally, end flanges 118 as shown in the assembly drawing of FIG. 11 and the detailed view of FIG. 11(*a*), serving the same purpose as the integral flanges 18 in FIGS. 1 to 4, are riveted (or alternatively spot welded) to the transverse cut ends of each panel for fixing each panel to an adjacent panel.

In the preceding embodiments a hard polymer lining 114 is optionally sprayed onto the exposed surface of the foam/insulating layer 38 or 110, FIGS. 5 and 10. This has two advantages. First, it provides a hardened surface which serves to protect the underlying layer 38 or 110 when the ducts are being cleaned. Second, although the layer 38 or 110 has a certain amount of flame resistance, it can still be flammable. The hard polymer lining is a flame retardant, and provides a higher fire resistance than the underlying material. The hard polymer layer 114 has a thickness of about 3 mm, in contrast with the layer 38 or 110 which is typically 32 mm thick. The flame retardant polymer 114 is preferably of the type produced by BASF under the mark Elastocoat C6325/105.

Figure 11:
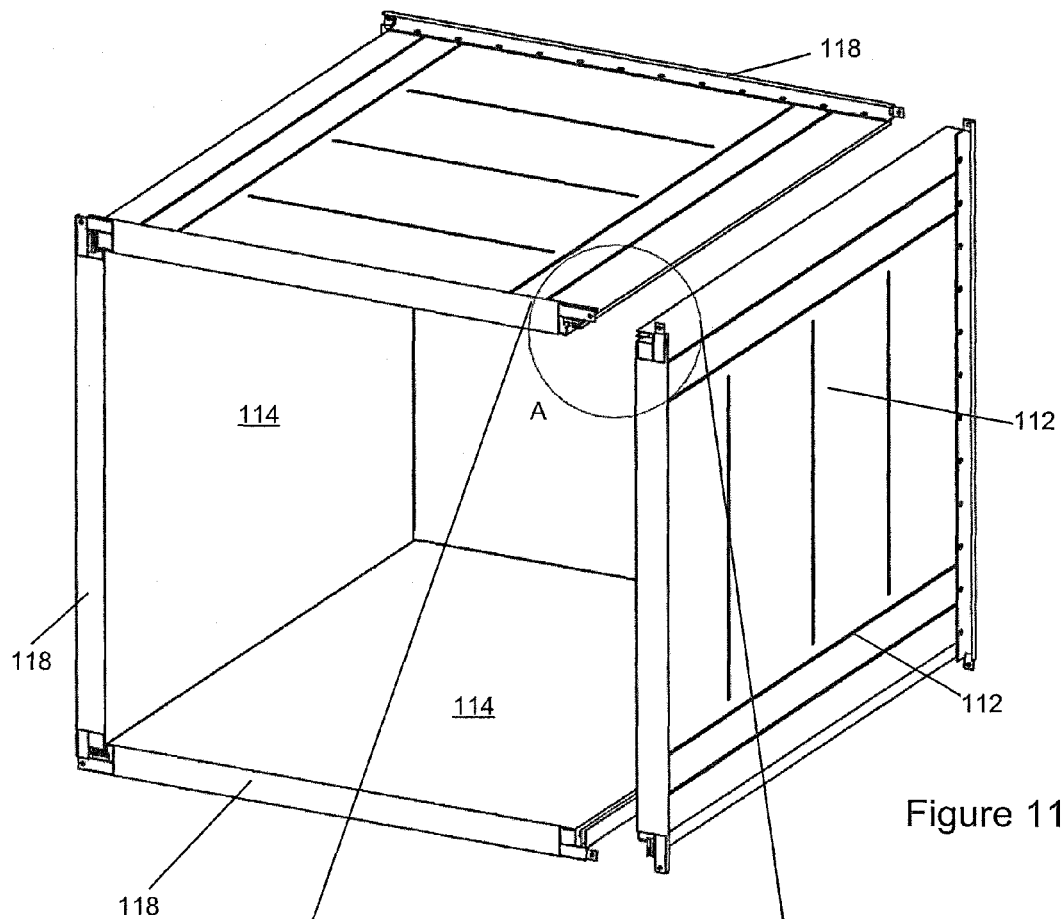
FIGS. 11 and 11(a) show detailed views of assembled ducting including the panels of FIG. 10.
Figure 11A:
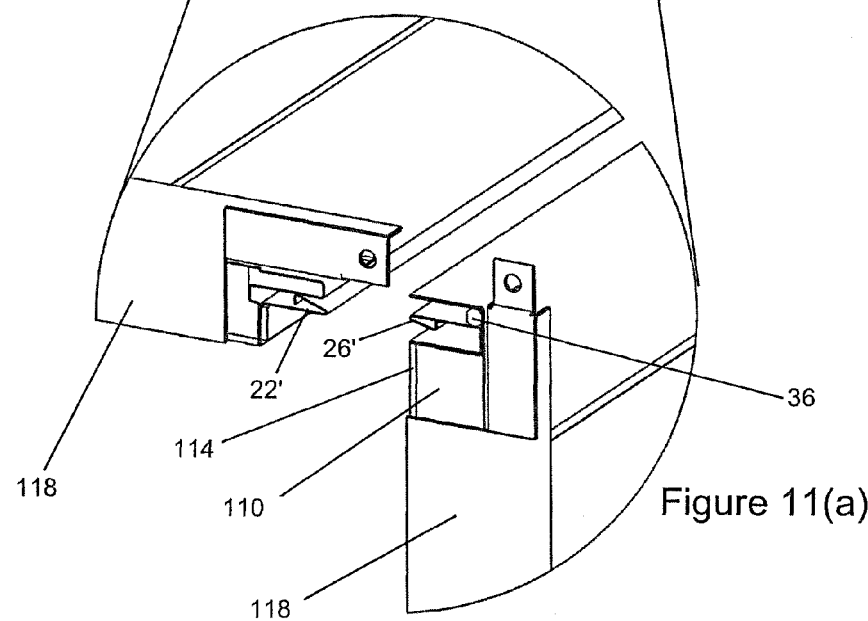

In embodiments of the invention where the assembled ducting, for example as shown in FIGS. 11 and 11(*a*), includes an insulating layer 110 possibly coated with a polymer lining 114, a durable and relatively impervious internal lining is provided, by comparison with using for example Rockwool or equivalent as an insulator either within or around the ducting. This layer/lining does not accommodate rodents or harbour or promote the spread of bacteria, such as *Legionella* as readily as prior art systems. At the same time, the ducting can be transported in flat packed form and when assembled can provide a relatively airtight conduit for use in many applications.

Typical applications for the invention are in heating, ventilation, air-conditioning and refrigeration ducting.

Advantages of the invention are:

The component panels can be formed in high volume and at low cost.

Joints are formed as an integral part of each panel during the manufacturing process and so do not have to be made and fitted separately.

The component panels that make up the assembly can be mass produced and palletised automatically, protected and made ready for shipping on an automated line. This results in low raw material cost, labour cost and machining costs.

Overland haulage, shipping and airfreight costs are reduced, since volume is reduced.

Storage, loading, unloading and handling at all stages along the supply chain are facilitated by pre-palletising.

Panels can be landed and positioned close to the point of use. Subsequently, when de-palletised, the panels can individually be moved to the installation point and easily assembled there.

The invention is not limited to the embodiments described herein which may be modified or varied without departing from the scope of the invention.

What is claimed is:

1. A tubular duct member comprising a plurality of circumferential sheet material panels joined along adjacent longitudinal edges by cooperating sheet material catches formed along each edge, the catches being pushed together such that respective detent surfaces on each catch engage behind one another to retain the edges of the sheets together, wherein at least one of the catches includes a body of resilient material compressed between the catches and biasing the catches apart to maintain the detent surfaces bearing against one another, wherein each catch comprises a rib of triangular cross-section extending along the respective edge, the detent surfaces being surfaces of said ribs.

2. A duct member as claimed in claim 1, wherein each catch comprises a folded metal rib.

3. A duct member as claimed in claim 1, wherein a first catch comprises a first channel having opposite sidewalls with a first rib running along the inside of one sidewall of the first channel, and the second catch comprises a flange with a second rib running along its length, the flange being inserted into the first channel so that the ribs engage behind one another.

4. A duct member as claimed in claim 3, wherein the second catch comprises a second channel having opposite sidewalls with the second rib running along the outside of one sidewall of the second channel, wherein the sidewall of the first channel opposite the first rib is inserted into the second channel, and wherein the body of resilient material is located at the base of the second channel for engagement by the sidewall of the first channel inserted therein.

5. A duct member as claimed in claim 3, wherein the one sidewall of the first channel is resiliently deflectable away from the opposite wall to allow the first rib to pass by it when engaging the catches.

6. A duct member as claimed in claim 1, further including a layer of thermally insulating material lining the inside surfaces of the panels.

7. A duct member as claimed in claim 6, further including a layer of a flame retardant polymer on the layer of thermally insulating material.

8. A duct member as claimed in claim 6, wherein the panels are substantially flat and the catches along the opposite edges of each panel each includes an upstanding wall defining with the main body of the panel a shallow tray across the width of the panel, the tray containing a layer of a cured thermally insulating polymer.

9. A duct member as claimed in claim 1, wherein there are four substantially flat panels joined edge to edge to form a duct member of substantially rectangular cross-section.

10. A duct member as claimed in claim 1, wherein there are a plurality of curved panels joined edge to edge to form a duct member of rounded cross-section.

\* \* \* \* \*